United States Patent

Wolfe

[15] 3,648,400
[45] Mar. 14, 1972

[54] LURE BOX

[72] Inventor: Henry S. Wolfe, Beaver Hill Apart., Apt. #B-219, Jenkintown, Pa. 19046

[22] Filed: Jan. 9, 1970

[21] Appl. No.: 1,668

[52] U.S. Cl. .......................................................... 43/54.5
[51] Int. Cl. ..................................................... A01k 97/00
[58] Field of Search ........................... 43/57.5, 54.5; 229/6 A; 220/31 S

[56] References Cited

UNITED STATES PATENTS

| | | | |
|---|---|---|---|
| 1,150,776 | 8/1915 | Lamb | 43/54.5 X |
| 3,201,017 | 8/1965 | Morrissey | 43/57.5 R X |
| 1,999,779 | 4/1935 | Perrine | 43/57.5 |
| 2,125,856 | 8/1935 | De Witt | 43/57.5 X |
| 2,481,618 | 9/1949 | Rockhill | 43/54.5 X |
| 3,182,872 | 5/1965 | Brosseau | 43/57.5 X |

*Primary Examiner*—Hugh R. Chamblee
*Attorney*—Caesar, Rivise, Bernstein & Cohen

[57] ABSTRACT

A lure box comprising a container and a lid therefor. The container is divided into a plurality of compartments for separating and containing fishing lures. One of the compartments has at least one sidewall and the bottom thereof perforated. The lid is also perforated in the area of the perforated compartment. Wet lures are placed in the perforated compartment to facilitate the drying of the lures after use.

3 Claims, 7 Drawing Figures

PATENTED MAR 14 1972
3,648,400
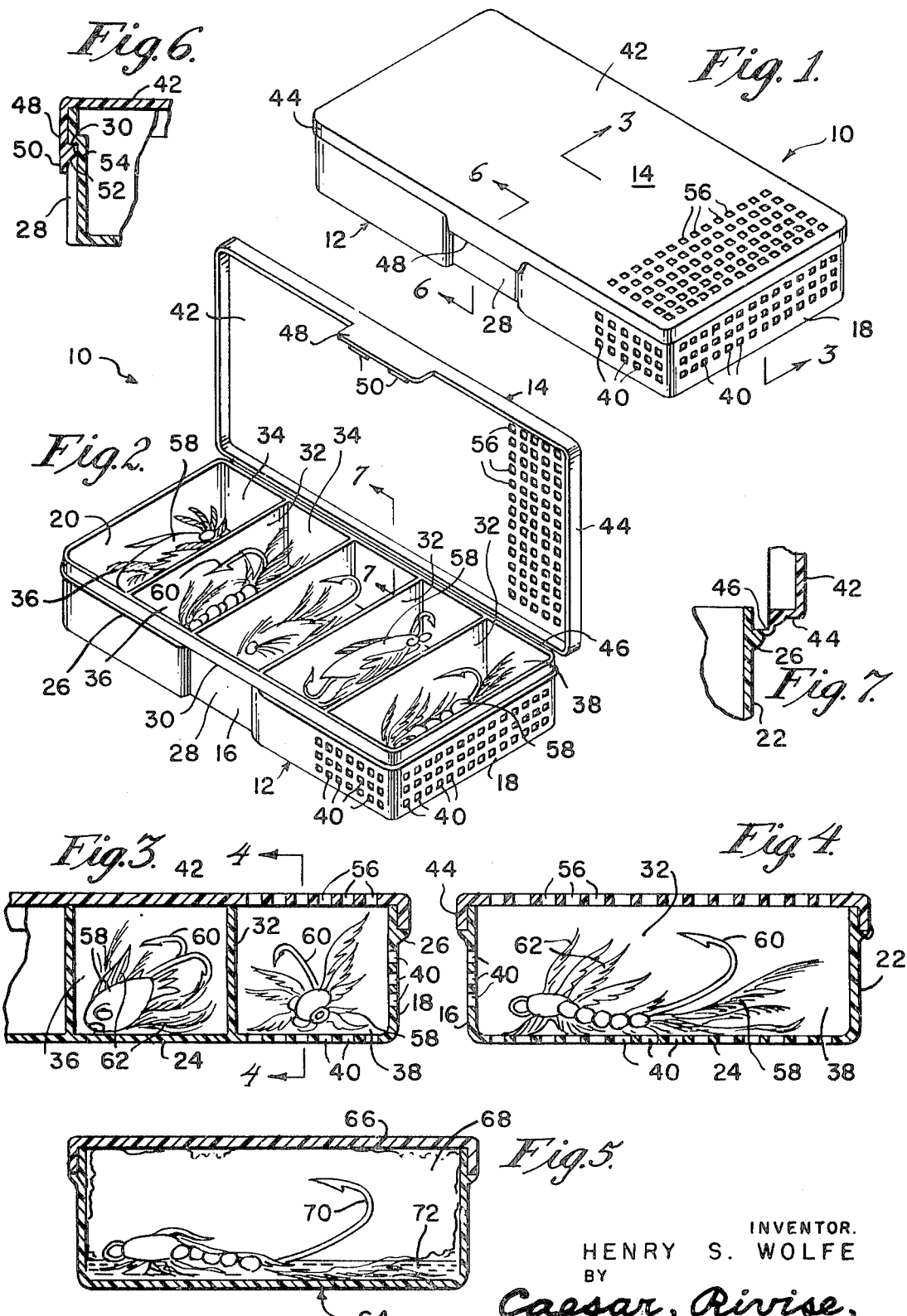
INVENTOR.
HENRY S. WOLFE
BY
Caesar, Rivise,
Bernstein & Cohen

LURE BOX

This invention relates to a lure box, and more particularly, to a box for holding wet and dry fishing lures.

Among the apparatus normally carried by a fisherman is a lure box. Boxes of this type contain an assortment of fishing lures, and the fisherman will carry the box in his pocket or in his tackle box. Lure boxes are available in literally hundreds of different shapes, with innumerable types of internal compartments for separating the lures.

When a fisherman uses a lure he selects it from one of the compartments and uses it to fish. If the fisherman is unsuccessful in catching any fish with this lure, quite often he will change to another lure. When doing this, he will place the wet lure from the line back into one of the compartments of the lure box with other dry lures. Since the lure box is usually semi-sealed and watertight, the moisture on the wet lure will eventually rust the wet lure and the metal parts of other lures that are in the same compartment. Additionally, there is a great deal of condensation of moisture from the wet lure on other lures within the box and this creates a rust problem.

Accordingly, every time a fisherman puts a wet lure in his lure box he is doing damage to all of the other dry lures in the box. This problem is multiplied when the lure he uses has feathers or other water-holding materials on it. Even when all metal lures are used, there is still enough surface moisture left on the lures to create damage.

It has been found that when utilizing hair or feather lures which absorb water, it takes literally hours or days before this lure is fully dry when using the lure boxes presently available. During this period of time, rust can be formed on all of the lures in the box.

Since a great many lures are placed in a box, and each lure is relatively costly, the rusting problem is acute. All of the problems of rusting of lures are eliminated when utilizing the lure box of this invention.

It is accordingly an object of this invention to provide a novel lure box.

It is a further object of this invention to provide a lure box having a drying compartment for wet lures.

These and other objects of this invention are accomplished by providing a lure box comprising a container and a lid therefor, said container having a plurality of compartments formed therein, with each of said compartments adapted to hold a lure therein, and at least one of said compartments being perforated in order to facilitate the drying of wet lures placed therein.

Other objects and many of the attendant advantages of this invention will be readily appreciated as the same becomes better understood by reference to the following detailed description when considered in connection with the accompanying drawings wherein:

FIG. 1 is a perspective view of the lure box of this invention in the closed position;

FIG. 2 is a perspective view of the lure box of FIG. 1 in the open position;

FIG. 3 is an enlarged sectional view taken along the line 3—3 of FIG. 1;

FIG. 4 is a sectional view taken along the line 4—4 of FIG. 3;

FIG. 5 is a sectional view similar to FIG. 4, but showing the prior art construction;

FIG. 6 is an enlarged sectional view taken along the line 6—6 of FIG. 1; and

FIG. 7 is an enlarged sectional view taken along the line 7—7 of FIG. 2.

Referring now in greater detail to the various figures of the drawings wherein like reference characters refer to like parts, a lure box embodying the present invention is generally shown at 10 in FIG. 1. Device 10 basically comprises a container 12 having a lid 14 hingedly mounted thereon.

Container 12 is basically a rectangular box having a front wall 16, side walls 18 and 20, a rear wall 22 (FIG. 4) and a bottom 24. A rim 26 extends around the front, side and rear walls of the container. Rim 26 terminates at recess 28 in front wall 16. A lip 30 (FIGS. 2 and 6) is formed at the top of recess 28.

A series of parallel walls 32 is formed in container 16 thereby dividing the container into a plurality of compartments 34. The endmost compartment, which is indicated at 38, has the front wall, side wall and bottom thereof provided with a plurality of openings 40 which pass completely through the walls and bottom.

Lid 14 includes an upper flat plate 42 having a dependent rim 44 extending around the entire perimeter thereof. A thin plastic strip 46 is integrally molded with the rear portion of rim 26 of container 12 and the rear portion of rim 44 (FIG. 7). Strip 46 hingedly mounts lid 14 on container 12.

A lip 48 projects downwardly from rim 44 in the area of recess 28. A pair of tabs 50 is molded on the inner side of lip 48. Each tab 50 includes a bevelled surface 52 and a flat upper edge 54 (FIG. 6). Tabs 50 cooperate with lip 30 of container 12 in holding the lid 14 in the closed position shown in FIG. 1. Thus, when it is desired to close the lid, the bevelled surface 52 cams tabs 50 and the associated lip 48 away from container 12. After the tabs have passed lip 30, the tabs are snapped into recess 28 and the lid is held closed by the abutment of the flat edges 54 against the underside of lip 30. When it is desired to open the box, lip 48 is pulled outwardly until the tabs 50 are free of lip 30, and the lid can then be pivoted around the hinge formed by plastic strip 46.

Lid 14 is provided with a plurality of openings 56 in the area of compartment 38. Openings 56 pass entirely through the lid, thereby placing compartment 38 in air communication with the atmosphere.

The lure box is used for supporting lures in the same manner as the boxes of the prior art. Thus, lures 58 are placed in each of the compartments 34. Any of the various types of lures, such as spinners, plugs, jigs and spoons can be accommodated by the lure box of this invention. By way of example, feather jigs are shown which comprise metal hooks 60 and fish attracting feathers 62. However, the invention is equally applicable for use with all-metal lures or lures formed of a combination of metal, hair and feathers. The specific type of lure accommodated by the box of this invention forms no part of the invention. It should also be noted that for the purpose of clarity, only one lure has been placed in each compartment 34. In use, quite often a fisherman will place a number of lures in each compartment of the lure box.

The initial use of the lure box of this invention is the same as the use of any of the lure boxes of the prior art. Thus, the fisherman will open the lure box to the position shown in FIG. 2 and select one of the lures 58. He will then fish with that lure. After he has completed his fishing with that lure, he will place the wet lure in compartment 38. Any other lures used during the day will also be placed in compartment 38. At the end of the day, the lure box will be closed to the position shown in FIG. 1, with all of the wet lures being in compartment 38. Since compartment 38 is completely exposed to the atmosphere through openings 40 and 56, the wet lures are readily dried. The drying is expedited in view of the fact that air can pass completely through the compartment since the compartment is open on the sides, top and bottom. In the embodiment shown, the rear wall 22 of compartment 38 is shown as being impervious. However, if desired, this wall can also be perforated.

By providing the drying compartment 38, all of the wet lures are readily dried without depositing moisture on the lures in any of the compartments 34. The impervious internal wall 32 (FIG. 2) of compartment 38 prevents any of the surface moisture remaining on the wet lures in compartment 38 from passing into the compartments 34 containing the dry lures. Any of the moisture on the wet lures that is vaporized will not condense on the dry lures, since this moisture will pass into the atmosphere through the openings. Contrasted with this, in the prior art lure boxes, which are semi-sealed, the moisture from the wet lures will condense on all of the other lures in the box, thereby causing rusting.

In FIG. 5, a section of a prior art lure box is shown. The prior art box includes a container 64 having a lid 66 and a plurality of compartments 68 (one shown in FIG. 5). A wet lure 70 is shown within compartment 68, with water 72 deposited in the bottom of the compartment. It is this water 72 which causes the rusting of all of the lures in the wet compartment and any of the other compartments of the prior art lure boxes. This moisture can not form in the lure box of this invention, since it will immediately pass through the bottom openings 40 in compartment 38. Likewise, any of the vaporized moisture will immediately pass into the atmosphere through the openings 40 and 56.

The lure box of this invention can be formed from any of the materials known to the art. Preferred materials are moldable plastics, because of their lightness, durability and water resistance. A preferred plastic is polypropylene, but other moldable plastics such as acrylonitrile-butadiene-styrene (ABS) or polyethylene can be used. The lure box can be molded by any of the molding methods known to the art. Injection molding is preferred. During the molding process, the container 12, the lid 14 and the plastic strip hinge 46 are molded as a unitary item. If desired, the lid and container can be separately molded and hinged thereafter by heat sealing a plastic hinge to the lid and container. Alternatively, a metallic hinge, such as aluminum, can be secured to the container and lid, as by riveting or screwing.

The lure box can also be formed by any other materials known to the art. Accordingly, it can be formed from aluminum or other non-rusting metal. It can also be formed from any metallic base and given a plastic coating, by methods well known to the art.

It is thus seen that the lure box of this invention provides a distinct advantage over all of the lure boxes of the prior art. The compartment 38 provides a means of readily drying all wet lures without rusting the wet lures or rusting any of the other lures in the closed compartments of the lure box. Any surface moisture which drips from the lures after use will immediately be drained through the bottom openings 40. The remaining surface moisture will then be vaporized and passed through the openings 40 and 56.

Without further elaboration, the foregoing will so fully illustrate my invention, that others may, by applying current or future knowledge, adopt the same for use under various conditions of service.

What is claimed as the invention is:

1. A lure box comprising a container and a lid therefor, said container and lid comprised of plastic material and being integrally hingedly secured together by flexible strip means, said container having a plurality of storage compartments and at least one drying compartment formed therein, said storage compartments being adapted to hold and store fishing lures in a dry state, said storage compartments having impervious walls and bottoms, with said lid being impervious in the area of said storage compartments over which it lies, said impervious walls having top edges which contact said lid when said lid is closed on said container, said drying compartment having a plurality of holes formed therein to expose the interior of said drying compartment to the atmosphere when said lid is in closed position on said container in order to facilitate the drying of wet lures placed therein, and said drying compartment having one wall comprising one of said impervious walls, whereby the moisture from the wet lures placed in said drying compartment cannot pass into the adjacent storage compartment because of said one of said impervious walls and the seal made between the top edge of said one of said impervious walls and the lid when the lid is closed.

2. The lure box of claim 1 wherein said container includes a rim extending around the front, side and rear walls thereof, and said lid includes a dependent rim, said dependent rim resting on said rim of said container when said lid is closed, said rims being integrally molded with their respective container and lid.

3. The lure box of claim 1 and further including a dependent lip on said lid and a recess in the front face of said container, said lip having tabs thereon which are received in said recess when said lid is closed, said lip being formed from a resilient plastic whereby said tabs may be snapped into or out of said recess in order to releasably secure said lid in its closed position.

* * * * *